United States Patent
Cai et al.

(10) Patent No.: US 10,289,723 B1
(45) Date of Patent: May 14, 2019

(54) DISTRIBUTED UNION ALL QUERIES

(71) Applicant: Amazon Technologies, Inc., Reno, NV (US)

(72) Inventors: Mengchu Cai, San Jose, CA (US); Anurag Windlass Gupta, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 732 days.

(21) Appl. No.: 14/465,134

(22) Filed: Aug. 21, 2014

(51) Int. Cl.
G06F 7/00 (2006.01)
G06F 17/30 (2006.01)

(52) U.S. Cl.
CPC .. *G06F 17/30498* (2013.01); *G06F 17/30442* (2013.01); *G06F 17/30486* (2013.01); *G06F 17/30584* (2013.01); *G06F 17/30592* (2013.01)

(58) Field of Classification Search
CPC .............. G06F 17/30584; G06F 17/30442
See application file for complete search history.

(56) References Cited

U.S. PATENT DOCUMENTS

| | | | | |
|---|---|---|---|---|
| 5,878,409 A | * | 3/1999 | Baru | G06F 17/30584 |
| 6,882,993 B1 | * | 4/2005 | Lawande | G06F 17/30383 |
| | | | | 707/714 |
| 2012/0109888 A1 | * | 5/2012 | Zhang | G06F 17/30584 |
| | | | | 707/610 |
| 2013/0290368 A1 | * | 10/2013 | Chen | G06F 17/30536 |
| | | | | 707/769 |
| 2014/0280032 A1 | * | 9/2014 | Kornacker | G06F 17/30442 |
| | | | | 707/718 |
| 2015/0248461 A1 | * | 9/2015 | Theeten | G06F 17/30516 |
| | | | | 707/718 |

* cited by examiner

*Primary Examiner* — Charles E Lu
(74) *Attorney, Agent, or Firm* — Davis Wright Tremaine LLP

(57) ABSTRACT

Queries that involve multiple tables in a data warehouse system may be specified through structured query language ("SQL") statements that include union, order by, and limit clauses. When the tables are partitioned, a query of this type may be processed by forming a query plan in which intermediate results are formed by applying sort and limit operators at the partition level, combining the intermediate results from the partitions, and again applying sort and limit operations. Additional clauses, such as a unique clause, may also be pushed down to the partition level and reapplied at the level of the result set.

21 Claims, 6 Drawing Sheets

US 10,289,723 B1

DISTRIBUTED UNION ALL QUERIES

BACKGROUND

Data warehouse systems may maintain datasets comprising a number of structurally related tables. For example, sales data for the previous twelve months might be kept in a collection of twelve tables, each containing data corresponding to a particular month. As time passes, the oldest table might be dropped and a new table, representing the current month, might be added. Data maintained in this manner may be queried through the use of structured query language ("SQL") statements that include union clauses to indicate that rows from multiple tables should be joined together. The SQL statements may also include clauses indicating a sort order and a limit on the number of rows that are to be returned. SQL statements of this sort may be used for reporting functions, such as selecting the top ten selling products over the last twelve months.

The aforementioned table structure and SQL statements are commonly employed. However, large data warehouse systems may not necessarily store data in a manner that corresponds directly to the table-oriented structure just described. For example, a table may itself be further broken down into segments known as partitions. Furthermore, for various reasons it may be difficult to efficiently process SQL statements on the partitioned data. One reason is that SQL statements and clauses have semantics that operate on tables or at higher levels, such as on subqueries. SQL semantics are not generally aware of partition-level operations.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed, in various embodiments, to process queries that explicitly or implicitly contain unions of rows from multiple partitioned tables, and that may also explicitly or implicitly contain sort orders and limits on a maximum number of rows to be returned, as determined with respect to a sort order.

In an embodiment, aspects of a SQL query that are indicative of operations to be performed at the table level may be pushed down into operations performed at the partition level. For example, in order to obtain a result set for a query that contains union, sort, and limit clauses, an embodiment may construct a query plan that contains a distributed sort limit operator for each partition involved in the query. Intermediate results for each partition may be transmitted to a coordinator node, sometimes referred to as a leader node, for combination. The embodiment may then perform an additional sort and limit operation on the combined intermediate results. A similar approach may be employed for SQL queries containing certain other clauses, such as a unique clause. Although the approach just described may involve performing multiple sort and limit operations, it may in some cases allow for a level of network utilization to be reduced due to an overall decrease in network traffic between computing nodes maintaining the partitions and the coordinator computing node.

Figure 1:
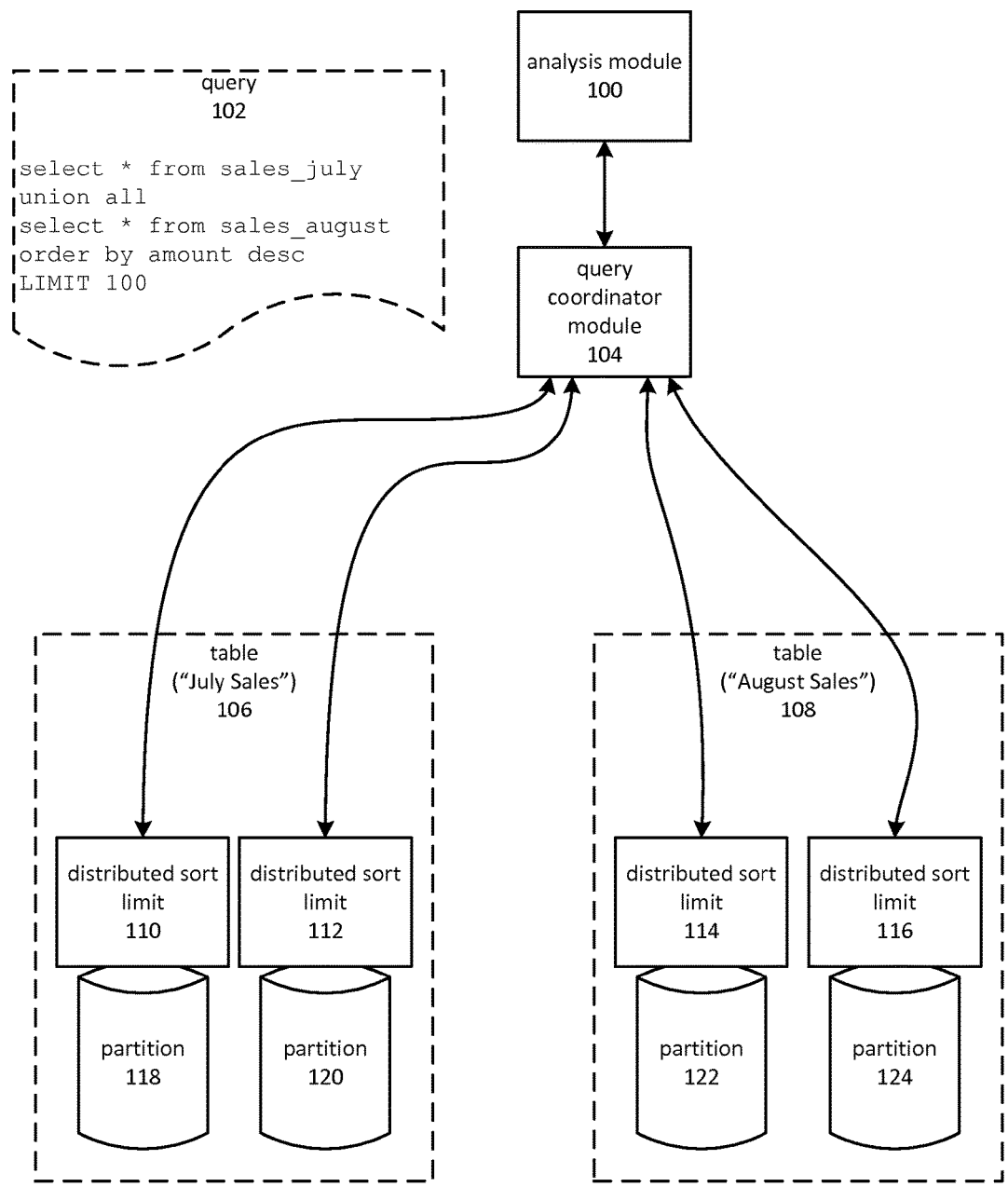
FIG. 1 is a block diagram depicting an embodiment of a distributed database system utilizing a distributed sort limit operator to obtain a result set for a query comprising a union of multiple tables, an ordering clause, and a limit clause.

FIG. 1 is a block diagram depicting an embodiment of a distributed database system utilizing a distributed sort limit operator to obtain a result set for a query comprising a union of multiple tables, an ordering clause, and a limit clause.

An analysis module 100 may include various mechanisms for initiating or triggering data analysis operations, such as those related to data mining, online analytical processing ("OLAP"), report generation, and so on. Analysis module 100 may comprise computer-readable instructions that, when executed by a computing device, performs operations related to initiating or triggering these types of operations. For example, an analysis module 100 might comprise a software application providing data analysis functions to a user. The analytical functions may be directed to a data warehouse in which data is stored on a number of partitions 118, 120, 122, and 124. A partition may refer to a computing node configured to maintain a portion of a table. For example, table ("July Sales") 106 may be maintained on partitions 118 and 120, while table ("August Sales") 108 may be maintained on partitions 122 and 124. Partition 118 may contain a first subset of table ("July Sales") 106, while partition 120 may contain a second subset. Similarly, partitions 122 and 124 may each contain a subset of table ("August Sales") 108.

A database table may be divided into a number of segments, each of which may be stored on a partition. A variety of partitioning schemes may be employed to determine which rows of a table are assigned to which partitions. In some cases and embodiments, a hash partitioning scheme may be employed in which rows are assigned to a partition based on the application of a hash function to a key value. This technique may be employed in a variety of situations, including those where an even distribution of rows between the available partitions is desired. In other embodiments, a round-robin scheme may be employed to assign rows to a partition. As a result of hash-based or round-robin partitioning, it may be the case that the resolution of certain queries may require the participation of all of a table's partitions, due to the manner in which rows are distributed based on the hash function.

In various scenarios, such as those related to data warehousing and OLAP, queries that utilize union clauses may be common. A union clause may describe the combining of intermediate result sets from more than one table. In FIG. 1, an example of a query containing a union clause is depicted by query 102. The query 102 may comprise select statements applicable to a number of tables. For example, query 102 comprises a "select * from sales_july" clause and a "select * from sales_august" clause that are linked by a "union all" clause. The query 102 may and are further modified by an "order by" clause indicative of a sort order for the results, and a limit clause indicative of a maximum number of rows to include in the result set. The rows included in the result set may be determined with respect to the order by clause. For example, consider a query over a dataset (combined from multiple tables) consisting of [1, 5, 4, 3, 2]. If the query specifies an ascending sort order and a limit of three rows, the result set would be [1, 2, 3]. If the sort order were instead descending, the result set would be [5, 4, 3].

A query 102 may be common in data warehousing and OLAP scenarios. As illustrated in FIG. 1, a query 102 may combine data from multiple related tables, such as the depicted case where a separate table is used for each month. Analysis of quarterly or yearly data, for example, may involve combining several months' worth of data from tables specified through a union clause. When fully processed, a result set for query 102 may be equivalent to what would be obtained by materializing the result of the union clause into a temporary table, sorting the temporary table, and retrieving the maximum number of rows from the sorted temporary table. Note that the semantics of the SQL union, order by, and limit clauses are applicable at or above the table-level. In other words, the union, order by, and limit clauses imply operations performed on rows after the rows are retrieved from a table. Furthermore, SQL and other query languages may be unaware of partition-level operations as they relate to union, order by, and limit clauses.

An analysis module 100 may issue query 102 to a distributed database system. A query coordinator module 104 may initiate and coordinate execution of query 102. The initial stages of executing query 102 may comprise analysis of query 102 and formation of a query plan for performing the query. A query plan may comprise information stored in a computer memory and indicating a series of operations to perform in order to process the query and form the corresponding result set. Some elements of the query plan may be performed by query coordinator module 104, while others may be performed by partitions 118, 120, 122, and 124. Certain operations may involve the transmission of row data from partitions 118, 120, 122, or 124 to query coordinator module 104, and vice versa. However, aspects of the present disclosure may be employed in various embodiments to reduce the transmission of row data. In various cases and embodiments, the query plan may be formed so as to push down various operations normally performed only at or above the table level so that those operations are performed at the partition level.

Embodiments may employ a query plan operator at the partition level to perform sort and limit operations local to the partition. For example, a distributed sort limit 110 may be performed on partition 118, distributed sort limit 112 may be performed on partition 120, distributed sort limit 114 may be performed on partition 122, and distributed sort limit 116 may be performed on partition 124. Intermediate result sets from performing these operations may be transmitted as row data to query coordinator module 104. However, because a limit is applied at the partition level, the amount of data transfer may be less than with other techniques for performing queries with union clauses.

Figure 2:
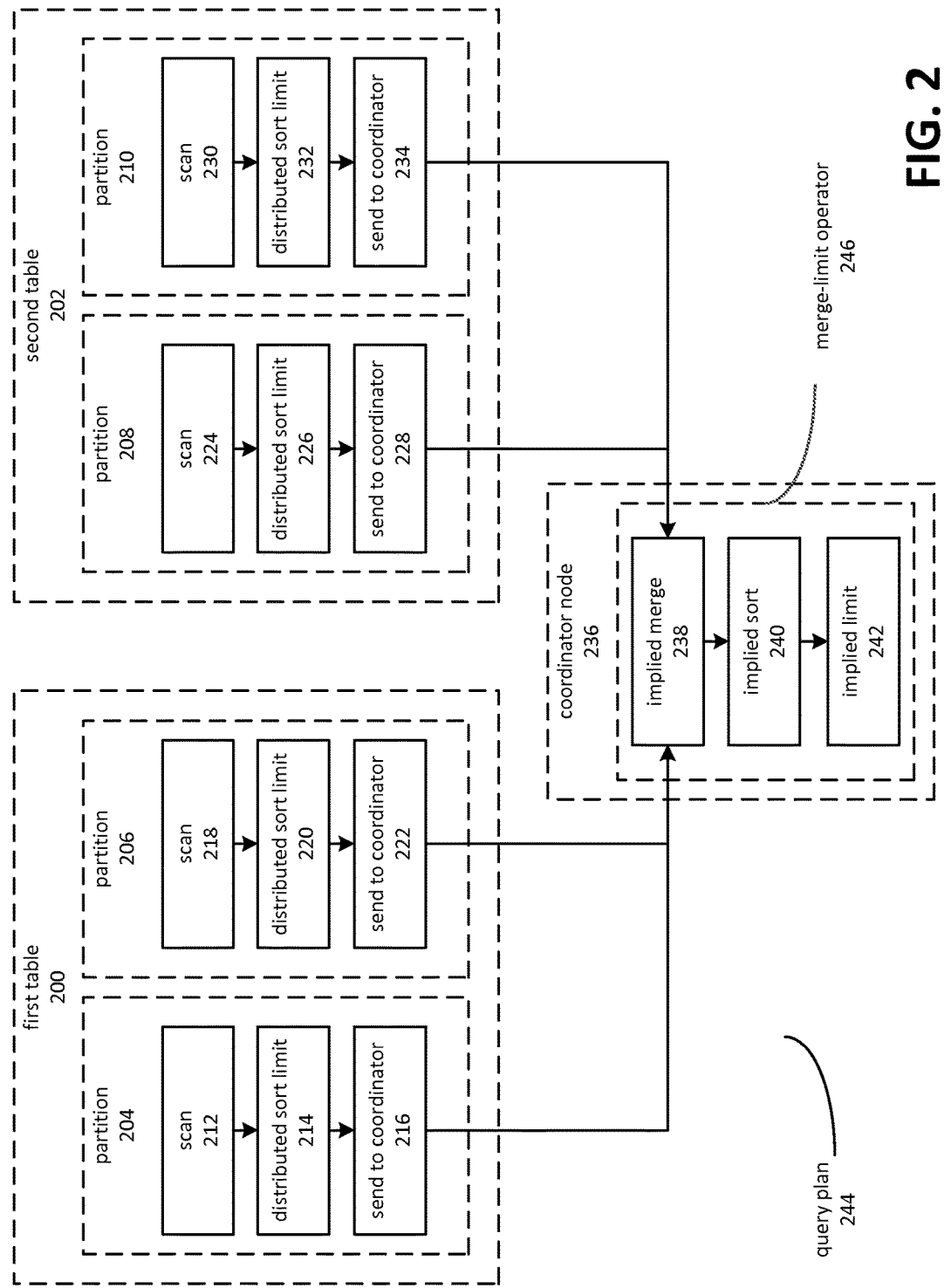
FIG. 2 is a flowchart depicting the use of a distributed sort limit query plan operator to obtain a result set for a query comprising a union clause involving two tables, where each table comprises two partitions.

FIG. 2 is a flowchart depicting the use of a distributed sort limit query plan operator to obtain a result set for a query comprising a union clause involving two tables, where each table comprises two partitions. A first table 200 may comprise partitions 204 and 206. A second table 202 may comprise partitions 208 and 210. Note that the arrangement depicted in FIG. 2 is intended to be illustrative of an example embodiment as applied to one possible case. In other cases and embodiments, various numbers of tables or partitions may be involved.

FIG. 2 depicts, for illustrative purposes, a query plan corresponding to a query that includes a union between first table 200 and second table 202. In other cases, unions between various numbers of tables may be specified. It may also be assumed, for illustrative purposes, that the corresponding query contained an indication of a sort operations and an indication of a limit operation, for example by including a SQL "sort by" clause and a SQL "limit" clause.

Query plan 244 may comprise various operators to be executed on partitions 204, 206, 208, and 210 and on coordinator node 236. On partition 204, a sequence of operators may be executed. The sequence may comprise scan 212, distributed sort limit 214, and send to coordinator 216. A scan operation may comprise traversing row storage or indexes to identify rows applicable to the query. For example, select clauses in the query may contain various filters which could be applied during the scan to identify rows that should be included in an intermediate result set to be formed on partition 204.

A distributed sort limit 214 operator may comprise sorting the partition-level intermediate result set obtained through scan 212, and then performing a limit operation. The limit operation applied at the partition level through distributed sort limit 214 may have been pushed down from at or above the table level during generation of query plan 244. A limit clause specified in the original SQL query may indicate a maximum number of rows. The value for the maximum number of rows may also be pushed down to the partition level and applied by distributed sort limit 214. The parameters of a sort by clause in the original query may also be pushed down. When distributed sort limit 214 is applied to the result of scan 212, the number of rows included in the intermediate result set for partition 204 is limited to the same maximum number of rows that was specified, at or above the label level, in the original SQL level. Note that because the sort and limit are applied at the partition level, the resulting intermediate result set may not be correct in the sense that it may contain rows that should not be included in a final result set for the query. This may be the case for a number of reasons. For example, when hash partitioning is used the distribution of rows on a particular partition may, for the purposes of executing the query, be considered essentially random. As a result, the intermediate result set formed by applying distributed sort limit 214 may also contain rows that are, to some degree, also essentially random to the same degree as the hash function.

The sorting and limiting aspects of distributed sort limit 214 may be accomplished, in various cases and embodiments, using any of a variety of different techniques, alone or in combination. These techniques include traversing indices, populating and sorting temporary tables local to the partition, and so on. In some cases embodiments may detect that data is already in the desired sort order, in which case the sort operation is a no-op.

A send to coordinator 216 operator may be processed to cause the intermediate result set from partition 204 to be send to coordinator node 236. The amount of row data transmitted may be limited to the maximum number of rows specified in the original query's limit clause, due to the operation of distributed sort limit 214.

Similar sequences of events may be performed on the remaining partitions. On partition 206, processing a sequence of query play operators including scan 218, distributed sort limit 220, and send to coordinator 222 may cause a second intermediate result set to be formed and sent to coordinator node 236. On partition 208, a third intermediate result set may be formed and sent to coordinator node 236 based on the sequence of operators including scan 224, distributed sort limit 226, and send to coordinator 228. A similar result for a fourth intermediate result set is obtained for the rows stored on partition 210 by processing operators scan 230, distributed sort limit 232, and send to coordinator 234.

At coordinator node 236, a merge-limit operator may combine the first, second, third, and forth result sets. The merge-limit operator 246 may be viewed as performing an implied merge 238, an implied sort 240, and an implied limit 242. These result of these implied operations may be side effects of a merge operation that performs ordering and limiting implicitly. The merge-limit operator 246 may combine rows from each of the result sets so as to produce a merged result set that is ordered and restricted to the indicated number of rows, consistent with the limit clause. In various embodiments, the merge-limit operator 246 may combine rows from the result sets according to a specified sort order, and may finish when the number of rows as specified in the limit clause has been added to the combined result set. Accordingly, the finished result set is equivalent to one that would have been produced by explicitly applying sort and limit operators to a combined result set. In various embodiments, this may help to reduce processing inefficiencies as compared to separate application of sort and limit clauses on the combined result sets. In addition, this approach may reduce overhead related to performing sorting and limiting operations on both coordinator node 236 and on partitions 204-210.

The sequence of operators depicted in FIG. 2 is intended to be illustrative of on example of partition-level processing of a distributed sort limit operation in which table-level or combined result-set merge and limit operations may be eliminated while still producing equivalent results. In various embodiments, the sequence of operators depicted in FIG. 2 may be altered, combined, or performed in parallel while remaining consistent with the various embodiments described herein.

Figure 3:
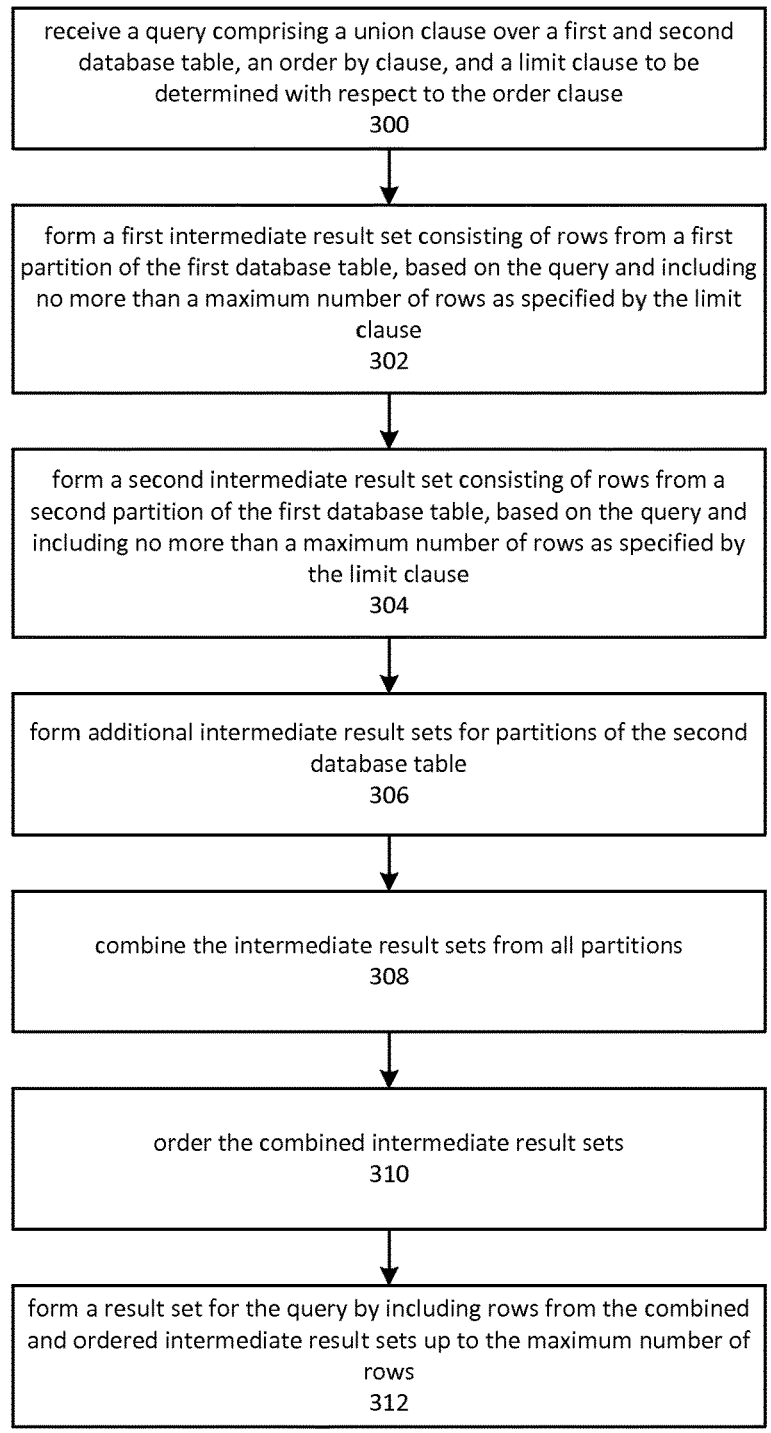
FIG. 3 is a flowchart depicting an embodiment of a process for processing a query with a union of two or more tables, a sort order, and a limit clause.

FIG. 3 is a flowchart depicting an embodiment of a process for processing a query with a union of two or more tables, a sort order, and a limit clause. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-readable instructions executed by a computing system, such as the computing systems described herein.

As depicted by element 300, an embodiment may receive a query comprising a union clause over a first and second database table, an order by clause, and a limit clause to be determined with respect to the order by clause. For example, a query expressed in SQL might be received by an embodiment, where the SQL is of the form:

"select * from table_A union all select * from table_B order by col_X desc limit 100"

The above example is intended to be illustrative and should not be viewed as limiting the scope of the present disclosure. In some cases, a query may implicitly comprise the above elements. For example, a query for rows corresponding to a range of values might implicitly comprise a union and order by clause. For example:

"select * from t1 where date >='7/01/2014' and date <='8/31/2014' order by c1 limit 100"

The above query may implicitly contain a union clause if, for the purposes of example, "t1" is assumed to be an alias corresponding to a collection of tables where each table contains a month's worth of data. For example, "t1" might be defined as a view:

"create view t1 as select * from table_A union all select * from table_B"

In this case, the select query on t1 implies a union between the tables filtered for the range between July and August. Similar examples may include range-based queries used with Not Only SQL ("NoSQL") database systems. To process these queries, the filter, sort, and limit operators may each be pushed down and applied at the partition level. The coordinator node may merge the intermediate result sets and may implicitly perform a final sort and limit as part of the merge.

In some embodiments, queries may be translated from an initial form into a form that comprises a union. For example, an embodiment might in some cases translate a range query to a query comprising a union and sort operator.

Element 302 depicts forming a first intermediate result set consisting of rows from a first partition of the first database table. The rows included in the result set may be based on the query. The number of rows included in an intermediate result set may be restricted to no more than a maximum number of rows as specified by the queries limit clause or as otherwise implied by the query.

Element 304 depicts forming a second intermediate result set consisting of rows from a second partition of the first database table. The second intermediate result set may be based on the query and may include no more than a maximum number of rows as specified by the limit clause or as otherwise implied by the query.

Additional intermediate result sets may be formed, as depicted by element 306, for partitions of the second database table, and for any additional database tables indicated by the query's explicit or implicit union clauses.

Embodiments may transmit the first intermediate result set, the second intermediate result set, and the additional intermediate result sets to a coordinator node in order to form a combined result set. Element 308 depicts combining the intermediate result sets received from all partitions. The combined result set may be stored in memory or on a storage device, such as a hard disk drive. Due to the application of the limit clause on each partition, the total number of rows in the combined result set may be sufficiently small enough to hold in the main memory of a computer system.

Element 310 depicts ordering the combined intermediate result set. The order applied may be applied as specified by the original query, and may be the same order that was pushed down and applied at the partition level.

Element 312 depicts forming a result set for the query by including rows from the combined and ordered intermediate result sets, up to the maximum number of rows explicitly indicated by a limit clause associated with the query, or otherwise explicitly or implicitly associated with the query.

In various embodiments, the operations depicted by the elements of FIG. 3 may be represented as a sequence of operators in a query plan generated by a coordinator computing node and distributed for execution to computing nodes hosting partitions of the tables indicated by the query's explicit or implicit union clause. A query plan may be generated and transmitted, in whole or in applicable parts, to each involved computing node. Each involved computing node may then process the operations described by the query plan that are applicable to the partition the computing node maintains.

In some embodiments, a "unique" clause applicable at or above the table level may be pushed down and applied at the partition level. A unique clause may include various indications that the rows returned as a result of processing a query should not be duplicated with respect to all other rows returned in the query. Techniques described herein for pushing down a unique clause to the partition level may, in some cases, reduce consumption of network bandwidth by reducing the number of rows that need to be transmitted from various partitions to a coordinator node. The techniques described herein as applicable to the unique clause may also be applied to similar clauses, such as a distinct clause.

Figure 4:
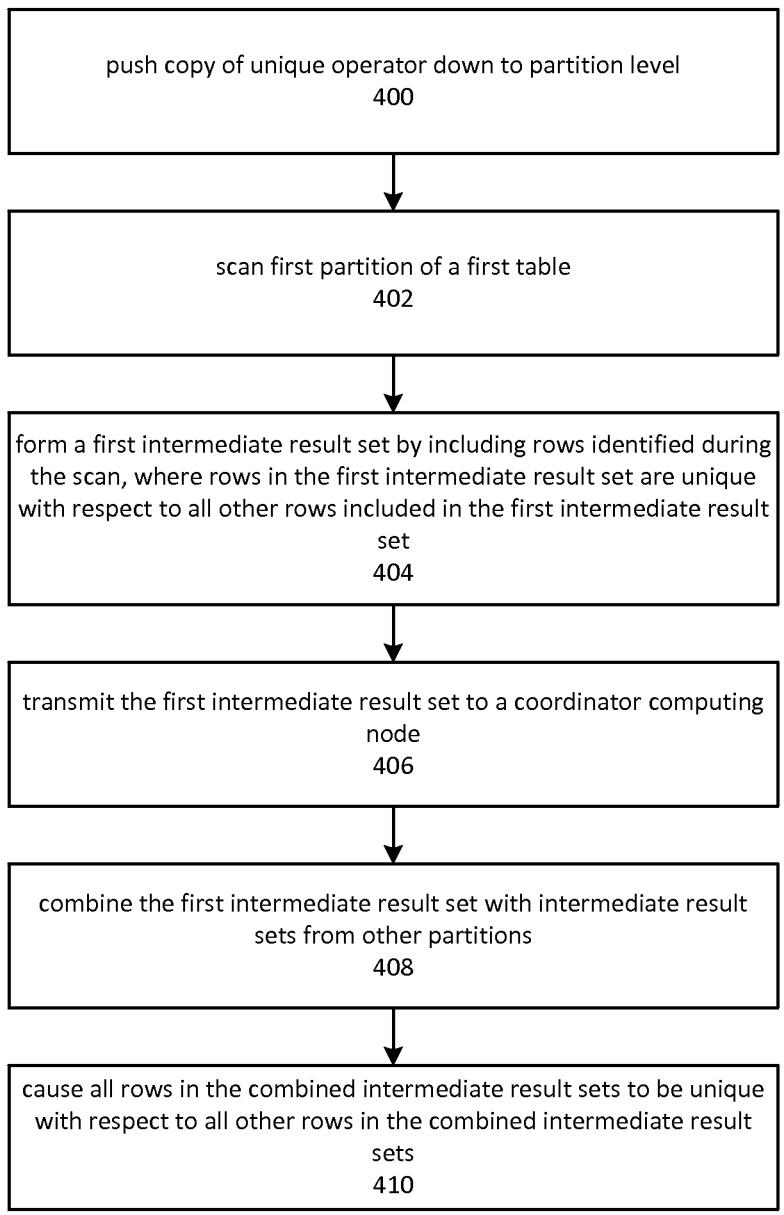
FIG. 4 is a flowchart depicting an example embodiment of a process for executing a distributed query containing a unique clause or implicitly requiring an application of a unique clause.

FIG. 4 is a flowchart depicting an example embodiment of a process for executing a distributed query containing a unique clause or implicitly requiring application of a unique clause. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-readable instructions executed by a computing system, such as the computing systems described herein.

Element 400 depicts an embodiment pushing a copy of a unique operator down to the partition level. An embodiment may do so by forming an operator in a query plan that is applicable to intermediate results to be returned at the partition level but otherwise similar to the unique operator as specified at or above the table level. For example, if a unique clause at or above the table level refers to a result set being unique with respect to a particular column, the unique operator to be applied at the partition level may also be applied with respect to the same particular column.

Element 402 depicts scanning a first partition of a first table specified in the query that explicitly or implicitly contains the unique clause. The query may also contain union clauses, and thus may refer to multiple tables.

Element 404 depicts forming a first intermediate result set by including rows identified in the scan, where the included rows are unique with respect to all other rows included in the first intermediate result set. Uniqueness may be determined with respect to the criteria specified in the query's unique clause and pushed down to the partition level. For example, if the query includes a unique clause that specifies "column X" as the column by which uniqueness is to be judged at or above the table level, an embodiment may also ensure that rows included in the intermediate result set are unique with respect to "column X."

Element 406 depicts transmitting the first intermediate result set to a leader computing node. As indicated by element 408, at the coordinator computing node the first intermediate result set may be combined with intermediate result sets from other partitions. The other partitions may correspond to the same table, or to additional tables if, for example, the query included a union clause.

Element 410 depicts causing all rows in the combined intermediate result sets to be unique with respect to all other rows in the combined intermediate result sets. At the partition level, processing of the unique operator will ensure that rows in an intermediate result set are unique with respect to other rows in the intermediate result set, but not with respect to rows in other intermediate result sets returned to the coordinator node from other partitions. Accordingly, the operation depicted by element 410 may be applied to ensure that the final result set contains only unique rows. Application of the unique clause to the combined result set may be applied as indicated by the unique clause in the query.

In various embodiments, the operations depicted by the elements of FIG. 4 may be represented as a sequence of operators in a query plan generated by a coordinator computing node and distributed for execution to computing nodes hosting partitions of the tables indicated by the query. A query plan may be generated and transmitted, in whole or in applicable parts, to each involved computing node. Each involved computing node may then process the operations described by the query plan that are applicable to the partition the computing node maintains.

In an embodiment, a system may comprise a first computing node that, when operational, maintains a first database partition corresponding to a first subset of a first database table. Additional partitions of the first database table may be maintained by additional computing nodes. The system may further comprise a second computing node that, when operational, maintains a second database partition corresponding to a second subset of a second database table. Additional partitions of the second database table may be maintained by additional computing nodes.

The system may further comprise one or more memories having stored thereon computer-readable instructions that, upon execution by a processor, cause the system to at least receive a query comprising a union clause indicative of forming a result set comprising rows from the first database table and rows from the second database table, an order clause, and a limit clause indicative of a maximum number of rows to include in the result set, wherein rows to be included in the result set up to the maximum number are determined with respect to the order clause; form a first intermediate result set consisting of rows from the first partition of the first database table, the first intermediate result set based at least in part on the query and including no more than a number of rows equal to the maximum number of rows indicated by the limit clause, the included rows based at least in part on the order clause; form a second intermediate result set consisting of rows from the second database partition of the second database table, the second intermediate result set based at least in part on the query and including no more than a number of rows equal to the maximum number of rows indicated by the limit clause, the included rows based at least in part on the order clause; combine the first intermediate result set, the second intermediate result set, and additional intermediate result sets obtained from additional partitions of the first database table and the second database table; order the combined result sets based at least in part on the order clause; and form the result set by including in the result set a number of rows from the combined and ordered result sets that is no more than the maximum number of rows.

The system may further comprise one or more memories having stored thereon computer-readable instructions that, upon execution by the one or more computing nodes, cause the system at least to: cause each row in the first intermediate result set to be unique with respect to all other rows in the first intermediate result set; transmit the first intermediate result set from the first computing node to a third computing node coordinating execution of the query; and cause each row in the result set to be unique with respect to all other rows in the result set.

In another embodiment, a method of performing a union query on a plurality of partitioned database tables may comprise receiving information indicative of forming a result set for a query comprising a union of rows from a first table and rows from a second table, ordering the result set, and limiting rows in the result set to a maximum number of rows determined with respect to the order; forming, by a first computing device, a first intermediate result set of rows from a first partition of the first table, the first intermediate result set including no more than the maximum number of rows, the included rows determined based at least in part on the order; forming, at a second computing device, a second intermediate result set of rows from a second partition of the second table, the second intermediate result set including no more than the maximum number of rows, the included rows determined based at least in part on the order; combining the first intermediate result set, the second intermediate result set, and one or more additional intermediate result sets from additional partitions of the first and second tables; and forming the result set by including in the result set a number of rows from the combined result sets that is no more than the maximum number of rows, the included rows determined with respect to the order.

In another embodiment, non-transitory computer-readable media or a computer program product may comprise instructions that, upon execution by one or more computing devices, cause the one or more computing devices to: receive information indicative of forming a result set for a query comprising a union of rows from a first table and rows from a second table, ordering the result set, and limiting rows in the result set to a maximum number of rows determined with respect to the order; form, by a first computing device, a first intermediate result set of rows from a first partition of the first table, the first intermediate result set containing no more than the maximum number of rows; form, at a second computing device, a second intermediate result set of rows from a second partition of the second table, the second intermediate result set containing no more than the maximum number of rows; combine the first intermediate result set, the second intermediate result set, and one or more additional intermediate result sets from additional partitions of the first and second tables; and form the result set by including in the result set a number of rows from the combined result sets that is no more than the maximum number of rows, the included rows determined with respect to the order.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as SQL, while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives. As used herein, storing data may refer to performing any of various types of operations that involve writing data, such as adding, inserting, changing, and deleting data. The terms "update" and "updating" data may also be viewed as being synonymous with storing data.

Figure 5:
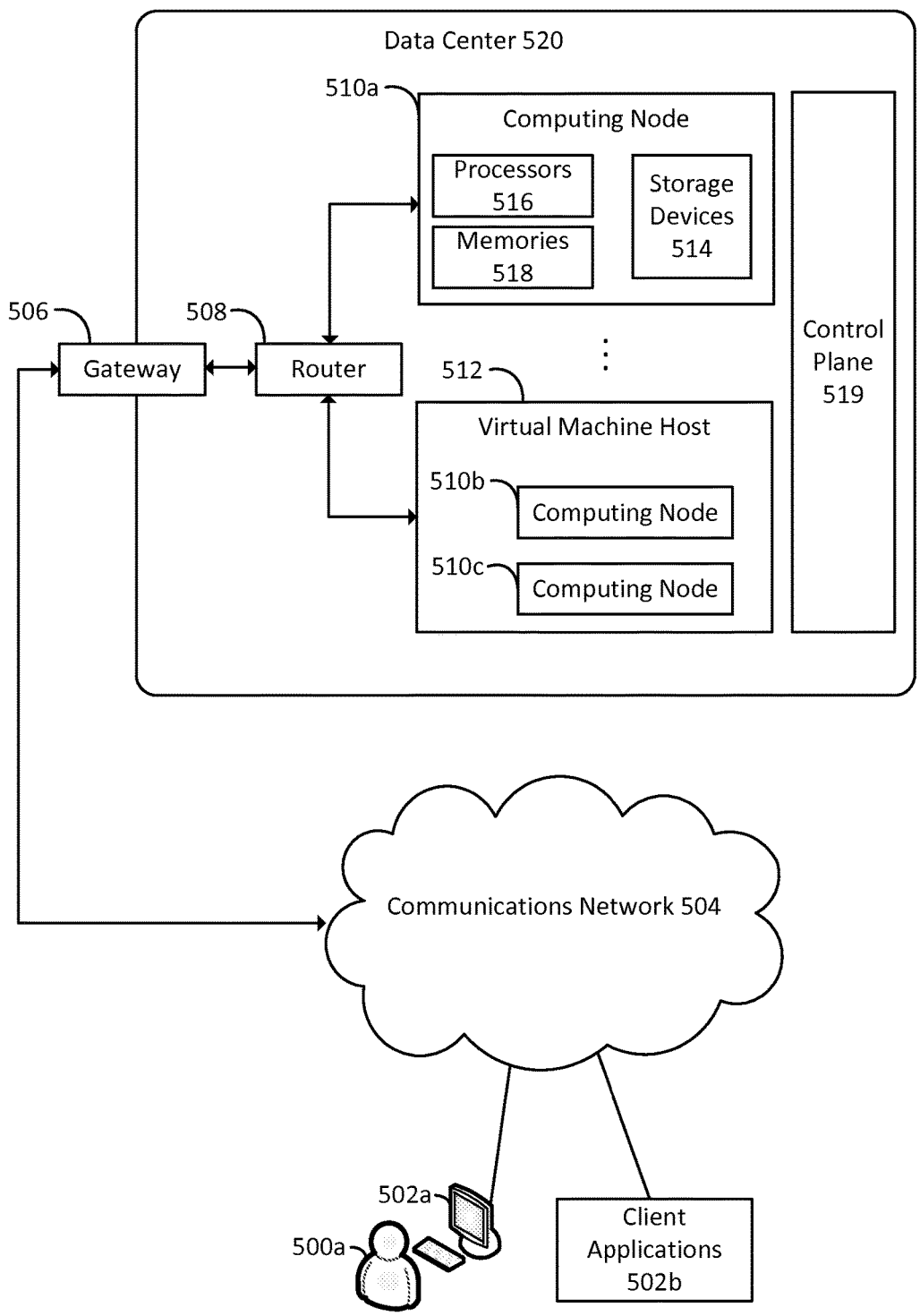
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

A control plane 519 may comprise a computing node configured to coordinate or manage operations of other computing resources in data center 520, such as computing nodes 510a, 510b, and 510c, as well as virtual machine host 512. A control plane 519 may also manage aspects of the configuration and operation of gateway 506 and router 508, as well as various other network components not explicitly depicted in FIG. 5. Embodiments may include an management interface in control plane 519 for managing control functions, such as creating new instances of a computing node, such as computing nodes 510a, 510b, or 510c, adding or configuring a virtual machine host 612, configuring network configuration of router 508, and so on. Embodiments of a control plane 519 may also comprise mechanisms for configuring services or controlling operation of services within data center 520.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
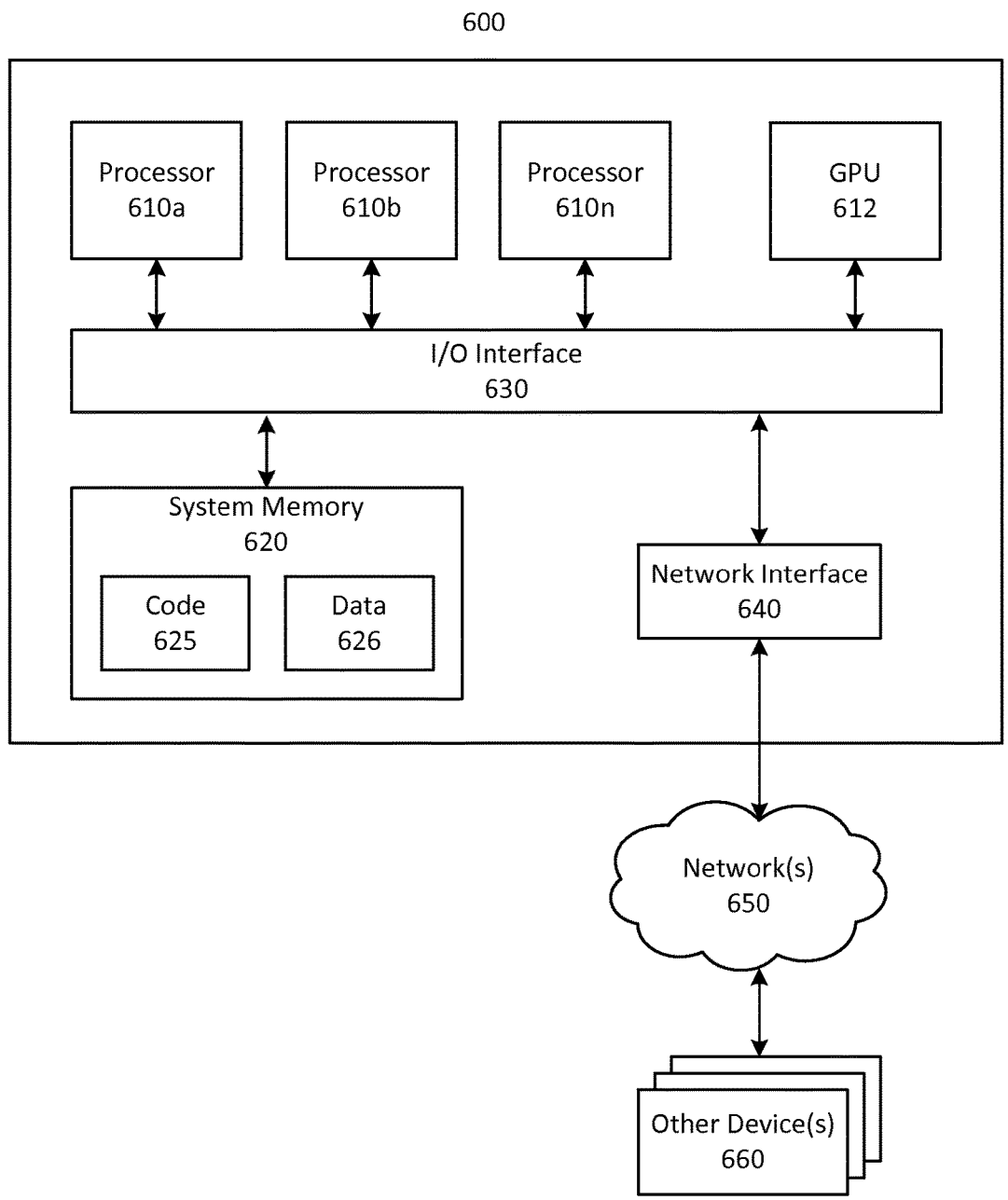
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
at least one processor; and
one or more memories having stored thereon computer-readable instructions that, upon execution by the at least one processor, cause the system at least to:
receive a query comprising a union clause indicative of forming a result set comprising rows from a first database table and rows from a second database table, an order clause, and a limit clause indicative of a maximum number of rows to include in the result set, wherein rows to be included in the result set up to the maximum number are determined with respect to the order clause, and wherein the union clause, the order clause, and the limit clause are applicable at a table-level;
form, on a first partition of the first database table, a first intermediate result set consisting of rows from the first partition of the first database table, the first intermediate result set based at least in part on the query and including no more than a number of rows equal to the maximum number of rows indicated by the limit clause, wherein the included rows are determined based at least in part on the order clause;
form, on a second partition of the second database table, a second intermediate result set consisting of rows from the second partition of the second database table, the second intermediate result set based at least in part on the query and including no more than a number of rows equal to the maximum number of rows indicated by the limit clause, wherein the included rows are determined based at least in part on the order clause; and
combine the first intermediate result set and the second intermediate result set to form the result set using a merge-limit operator, wherein the merge-limit operator combines rows from the first and second intermediate result sets according to the order clause and terminates upon combining the maximum number of rows.

2. The system of claim 1, wherein output of the merge-limit operator corresponds to a combination of the first and second intermediate result sets and an application of sort and limit operators to the combined intermediate result sets.

3. The system of claim 1, wherein output of the merge-limit operator is equivalent to output of materializing the result of the union clause into a temporary table, sorting the temporary table, and retrieving the maximum number of rows from the sorted temporary table.

4. The system of claim 1, wherein rows of the first table are assigned to the first partition based on a hash-partitioning function.

5. A method of performing a union query on a plurality of partitioned database tables, the method comprising:
receiving information indicative of forming a result set for a query comprising a union of rows from a first table and rows from a second table, ordering the result set, and limiting rows in the result set to a maximum number of rows determined with respect to the ordering, wherein the query is applicable at a table-level;

forming, by a first computing device, a first partition-level intermediate result set of rows from a first partition of the first table, the first partition-level intermediate result set containing no more than the maximum number of rows;

forming, at a second computing device, a second partition-level intermediate result set of rows from a second partition of the second table, the second partition-level intermediate result set containing no more than the maximum number of rows; and combining the first partition-level intermediate result set and the second partition-level intermediate result set to form the result set using a merge-limit operator, wherein the merge-limit operator combines rows from the first and second partition-level intermediate result sets according to the ordering and terminates upon combining the maximum number of rows.

6. The method of claim 5, wherein output of the merge-limit operator corresponds to output of combining the first and second partition-level intermediate result sets and applying sort and limit operators to the combined partition-level intermediate result sets.

7. The method of claim 5, wherein output of the merge-limit operator corresponds to output of materializing the result of a union of the first and second tables into a temporary table, sorting the temporary table, and retrieving the maximum number of rows from the sorted temporary table.

8. The method of claim 5, wherein the first and second tables correspond to a same table, the same table comprising the first and second partitions.

9. The method of claim 5, further comprising:
translating a query over a view to the query comprising a union or rows from the first table and rows from the second table.

10. The method of claim 5, further comprising:
forming a query plan comprising information indicative of performing a distributed sort limit operation while forming the first partition-level intermediate result set.

11. The method of claim 5, further comprising:
forming a query plan in which a limit clause applicable to the first table is pushed down to a first operator to be performed on the first partition and a second operator to be performed on the second partition.

12. The method of claim 5, further comprising:
forming a query plan in which a unique clause is pushed down to the first partition and to the second partition.

13. The method of claim 5, wherein the information indicative of forming a result set is transmitted by a data analysis application.

14. A non-transitory computer-readable storage medium having stored thereon instructions that, upon execution by one or more computing devices, cause the one or more computing devices at least to:

receive information indicative of forming a result set for a query comprising a union of rows from a first table and rows from a second table, ordering the result set according to an order clause, and limiting rows in the result set to a maximum number of rows determined with respect to the ordering, wherein the query is applicable at a table-level;

form, by a first computing device, a first partition-level intermediate result set of rows from a first partition of the first table, the first partition-level intermediate result set including no more than the maximum number of rows, the included rows determined based at least in part on the ordering;

form, at a second computing device, a second partition-level intermediate result set of rows from a second partition of the second table, the second partition-level intermediate result set including no more than the maximum number of rows, the included rows determined based at least in part on the ordering; and combine the first partition-level intermediate result set and the second partition-level intermediate result set to form the result set using a merge-limit operator, wherein the merge-limit operator combines rows from the first and second partition-level intermediate result sets according to the order clause and terminates upon combining the maximum number of rows.

15. The non-transitory computer-readable storage medium of claim 14, wherein the merge-limit operator generates output equivalent to a result of materializing the result of a union of the first and second tables into a temporary table, sorting the temporary table, and retrieving the maximum number of rows from the sorted temporary table.

16. The non-transitory computer-readable storage medium of claim 14, wherein rows of the first table are assigned to the first partition or the second partition based on a round-robin assignment.

17. The non-transitory computer-readable storage medium of claim 14, comprising further instructions that, upon execution by the one or more computing devices, cause the one or more computing devices to at least:
query comprising a union of rows from a first table and rows from a second table.

18. The non-transitory computer-readable storage medium of claim 14, comprising further instructions that, upon execution by the one or more computing devices, cause the one or more computing devices to at least:
form a query plan comprising information indicative of performing a distributed sort limit operation while forming the first partition-level intermediate result set.

19. The non-transitory computer-readable storage medium of claim 14, comprising further instructions that, upon execution by the one or more computing devices, cause the one or more computing devices to at least:
form a query plan in which a limit clause applicable to the first table is pushed down to a first operator to be performed on the first partition and a second operator to be performed on the second partition.

20. A non-transitory computer-readable storage medium having stored thereon instructions that, upon execution by one or more computing devices, cause the one or more computing devices at least to:

receive information indicative of forming a result set for a query comprising instructions indicative of returning a result set in which each row in the result set is unique with respect to all other rows in the result set, wherein the query is applicable at a table-level;

form, by a first computing device, a first partition-level intermediate result set of rows from a first partition, the rows of the first partition-level intermediate result set being unique with respect to all other rows in the first partition-level intermediate result set;

form, by a second computing device, a second partition-level intermediate result set of rows from a second partition, the rows of the second partition-level intermediate result set being unique with respect to all other rows in the second partition-level intermediate result set; and form the result set by including rows from the first partition-level intermediate result set and the second partition-level intermediate result set, wherein rows included in the result set are unique with respect to all other rows in the result set.

21. The non-transitory computer-readable storage medium of claim 14, wherein the first partition-level intermediate result set is formed by a sort limit operator.

* * * * *